(12) United States Patent
Wang et al.

(10) Patent No.: US 11,272,547 B2
(45) Date of Patent: Mar. 8, 2022

(54) COMMUNICATION METHOD, NETWORK DEVICE, AND USER EQUIPMENT

(71) Applicant: Huawei Technologies Co., Ltd., Shenzhen (CN)

(72) Inventors: Yafei Wang, Shanghai (CN); Junchao Li, Shanghai (CN); Chi Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 16/716,320

(22) Filed: Dec. 16, 2019

(65) Prior Publication Data

US 2020/0120719 A1    Apr. 16, 2020

Related U.S. Application Data

(63) Continuation of application No. PCT/CN2018/091819, filed on Jun. 19, 2018.

(30) Foreign Application Priority Data

Jun. 16, 2017 (CN) .......................... 201710459670.3

(51) Int. Cl.
*H04W 4/00* (2018.01)
*H04W 74/08* (2009.01)
(Continued)

(52) U.S. Cl.
CPC ... *H04W 74/0833* (2013.01); *H04W 72/0446* (2013.01); *H04W 72/1268* (2013.01)

(58) Field of Classification Search
CPC ......... H04W 74/0833; H04W 72/0446; H04W 72/1268
See application file for complete search history.

(56) References Cited

U.S. PATENT DOCUMENTS

2011/0039499 A1*  2/2011  Zhang ................. H04W 74/008
                                                      455/67.11
2015/0156760 A1*  6/2015  Yu .................... H04W 72/0453
                                                      370/330
(Continued)

FOREIGN PATENT DOCUMENTS

CN       105393619 A      3/2016
CN       105682232 A      6/2016
(Continued)

OTHER PUBLICATIONS

US 9,584,299 B2, 02/2017, Fan et al. (withdrawn)
(Continued)

*Primary Examiner* — Siren Wei
(74) *Attorney, Agent, or Firm* — Leydig, Voit & Mayer, Ltd.

(57) ABSTRACT

A communications method is provided, to satisfy a requirement of indicating a random access resource dynamically and effectively reduce resource conflicts caused when PRACH resource configuration is performed. The method includes: sending, by a network device, a first message and a second message to user equipment, where the first message is used to indicate a set of candidate time domain resource units of a physical random access channel of the user equipment, the second message carries first indication information, and the first indication information is used to indicate a time domain resource unit format of a first candidate time domain resource unit in the plurality of candidate time domain resource units; and receiving, by the network device from the user equipment based on the time domain resource unit format, a random access preamble in the first candidate time domain resource unit.

18 Claims, 5 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2015/0359004 A1* | 12/2015 | Xu | H04W 74/0833 |
| | | | 370/329 |
| 2016/0113037 A1 | 4/2016 | Mizusawa | |
| 2016/0366671 A1 | 12/2016 | Ahn et al. | |
| 2019/0029050 A1* | 1/2019 | Li | H04W 72/042 |
| 2019/0082472 A1 | 3/2019 | Zhang et al. | |

FOREIGN PATENT DOCUMENTS

| | | | |
|---|---|---|---|
| CN | 107371242 A | 11/2017 | |
| EP | 2941006 A1 | 11/2015 | |
| EP | 3402266 A1 | 11/2018 | |
| JP | 2018535611 A | 11/2018 | |
| WO | 2017091693 A1 | 6/2017 | |

OTHER PUBLICATIONS

"RACH Procedures and Resource Configuration," 3GPP TSG RAN WG1 Meeting #89, Hangzhou, China, R1-1706976, pp. 1-7, 3rd Generation Partnership Project, Valbonne, France (May 15-19, 2017).

"Discussion on PRACH Configuration in NR," 3GPP TSG RAN WG1 NR Ad-Hoc Meeting, Spokane, USA, R1-1700653, pp. 1-5, 3rd Generation Partnership Project, Valbonne, France (Jan. 16-20, 2017).

"Initial views on frame structure for NR access technology," 3GPP TSG RAN WG1 Meeting #84bis, Busan, Korea R1-163112, pp. 1-7, 3rd Generation Partnership Project, Valbonne, France (Apr. 11-15, 2016).

"WF on assignment for DL and UL transmission," 3GPP TSG RAN WG1 #89 Meeting, Hangzhou, P.R. China, R1-1709795, pp. 1-3, 3rd Generation Partnership Project, Valbonne, France (May 15-19, 2017).

"3rd Generation Partnership Project; Technical Specification Group Radio Access Network; Evolved Universal Terrestrial Radio Access (E-UTRA); Physical channels and modulation (Release 14)," 3GPP TS 36.211 V14.2.0, pp. 1-196, 3rd Generation Partnership Project, Valbonne, France (Mar. 2017).

"3rd Generation Partnership Project; Technical Specification Group Radio Access Network; NR; Physical channels and modulation (Release 15)," 3GPP TS 38.211 V0.0.0, pp. 1-10, 3rd Generation Partnership Project, Valbonne, France (May 2017).

"3rd Generation Partnership Project; Technical Specification Group Radio Access Network; NR; Radio Resource Control (RRC); Protocol specification (Release 15)," 3GPP TS 38.331 V0.0.3, pp. 1-20, 3rd Generation Partnership Project, Valbonne, France (May 2017).

"Final Report of 3GPP TSG RAN WG1 #87 v1.0.0," 3GPP TSG RAN WG1 Meeting #88, Athens, Greece, R1-1701552, pp. 1-157, 3rd Generation Partnership Project, Valbonne, France (Feb. 13-17, 2017).

* cited by examiner

COMMUNICATION METHOD, NETWORK DEVICE, AND USER EQUIPMENT

CROSS-REFERENCE TO RELATED APPLICATIONS

This application is a continuation of International Application No. PCT/CN2018/091819, filed on Jun. 19, 2018, which claims priority to Chinese Patent Application No. 201710459670.3, filed on Jun. 16, 2017. The disclosures of the aforementioned applications are hereby incorporated by reference in their entireties.

TECHNICAL FIELD

Embodiments of this application relate to the field of communications technologies, and in particular, to a communication method, a network device, and user equipment.

BACKGROUND

A long term evolution (LTE) system standard formulated by the 3rd Generation Partnership Project (3GPP) is considered as a 4th generation wireless access system standard. In an existing LTE communications system and a time division duplex (TDD) mode, in a random access procedure of a user equipment (UE), a network device needs to send, to the UE, a system information block type 2 (SIB 2) broadcast message including a predefined random access resource index number, and the UE looks up a pre-stored random access resource configuration table according to the index number to determine a corresponding random access resource on which a random access procedure can be initiated, where the random access resource has a clear definition corresponding to each of different predefined uplink-downlink subframe configurations. The index number is semi-statically provided by the network device by using the SIB 2 broadcast message. To be specific, the UE looks up the table according to an index number that is sent by the network device and that is associated with an uplink-downlink subframe configuration, to determine a random access resource on which the random access procedure can be initiated. Because the semi-static random access resource allocation solution is a resource allocation solution limited by a predefined uplink-downlink subframe configuration, flexibility that the communications system allocates radio resources is limited.

With requirements of scenarios and services in a communications system are diversified, in a next-generation communications system, for example, in a new radio (NR) system, which is alternatively referred to as a 5th generation (5G) radio access system, different services have different resource requirements. In this case, a dynamic time division duplex (D-TDD) technology attracts wide attention. The D-TDD means that a network device can flexibly adjust an uplink-downlink subframe configuration. The network device may dynamically adjust a TDD uplink-downlink subframe configuration based on requirements of different services for uplink resources and downlink resources. However, for a communications system in which uplink and downlink resources of a cell are determined by the network device dynamically, how to determine a resource configuration of a physical random access channel becomes a problem to be urgently resolved.

SUMMARY

This application provides a communication method, a network device, and user equipment, to dynamically indicate a time-frequency resource of a physical random access channel.

According to a first aspect, an embodiment of this application provides a communication method, where the method includes: first sending, by a network device, a first message and a second message to user equipment, where the first message is used to indicate a set of candidate time domain resource units of a physical random access channel of the user equipment, and the set of candidate time domain resource units includes a plurality of candidate time domain resource units, the second message carries first indication information, and the first indication information is used to indicate a time domain resource unit format of a first candidate time domain resource unit in the plurality of candidate time domain resource units; and then receiving, by the network device from the user equipment based on the time domain resource unit format, a random access preamble in the first candidate time domain resource unit.

In this application, a first message is used to indicate a set of candidate time domain resource units of a physical random access channel of user equipment. In this case, the user equipment may determine, based on the indication of the first message, one candidate time domain resource unit in the set of candidate time domain resource units as a first time domain resource unit, so as to determine a time domain resource of a PRACH that is used to carry random access information. In this way, an uplink-downlink subframe configuration does not need to be predefined, and a requirement for dynamic indication of a random access resource in a communications system can be met, thereby improving random access resource allocation flexibility. Further, the set of candidate time domain resource units includes a plurality of candidate time domain resource units. This can effectively avoid a case in which a large quantity of user equipments attempt random access in one time domain resource unit simultaneously, and can effectively reduce resource conflicts that are probably caused when the user equipment performs PRACH resource configuration in a random access procedure.

In an optional design, the candidate time domain resource unit includes an uplink time domain resource region, the time domain resource unit format is one of a plurality of time domain resource unit formats, and uplink time domain resource regions included in the plurality of time domain resource unit formats have different sizes.

In this application, candidate time domain resource units may have different time domain resource unit formats, so that selection of resource configuration is more flexible.

In an optional design, the receiving, by the network device from the user equipment based on the time domain resource unit format, a random access preamble in the first candidate time domain resource unit includes: receiving, by the network device, the random access preamble in the first candidate time domain resource unit based on a first mapping mode corresponding to the time domain resource unit format of the first candidate time domain unit. The first mapping mode is one of a plurality of first mapping modes. The first mapping mode includes a mode of mapping between the random access preamble and a time domain position in the uplink time domain resource region.

In an optional design, the plurality of first mapping modes includes at least one of the following:

mode 1: the first time domain symbol of the uplink time domain resource region and the first time domain symbol of the random access preamble are spaced by M time domain symbols, where M is greater than or equal to 0;

mode 2: the first time domain symbol of the random access preamble is the first time domain symbol of the uplink time domain resource region, where the uplink time domain resource region includes a first time domain resource region and a second time domain resource region, the first time domain resource region is used to communicate the random access preamble, and the second time domain resource region is used as a guard time; and mode 3: the last time domain symbol of the random access preamble is the last time domain symbol of the uplink time domain resource region.

In this application, a plurality of modes of mapping between a random access preamble and an uplink time domain resource region are provided, so that resource mapping modes are more flexible. In particular, if mapping is performed in mode 3, the user equipment does not need to detect a time domain resource unit format of a time domain resource unit in which the random access preamble is sent. This can effectively reduce energy consumption of the user equipment, and reduce system overheads required for indicating a time domain resource unit format.

In an optional design, the plurality of first mapping modes are preset.

In an optional design, the method further includes: sending, by the network device, second indication information to the user equipment, where the second indication information is used to indicate the plurality of first mapping modes.

In an optional design, all candidate time domain resource units included in the set of candidate time domain resource units have a same time domain resource unit format.

When all candidate time domain resource units have a same time domain resource unit format, system overheads required for indicating a time domain resource unit format can be effectively reduced.

In an optional design, the set of candidate time domain resource units includes the first candidate time domain resource unit and a second candidate time domain resource unit, the first candidate time domain resource unit has a first time domain resource unit format, the second candidate time domain resource unit has a second time domain resource unit format, and the first time domain resource unit format is different from the second time domain resource unit format.

In an optional design, the receiving, by the network device from the user equipment based on the time domain resource unit format, a random access preamble in the first candidate time domain resource unit includes:

receiving, by the network device, the random access preamble in the first candidate time domain resource unit based on a random access preamble format corresponding to the time domain resource unit format of the first candidate time domain unit, where the random access preamble format is one of a plurality of different random access preamble formats.

In an optional design, random access preambles in the plurality of different random access preamble formats have different lengths.

According to a second aspect, this application provides a communication method, where the method includes: first receiving, by user equipment, a first message and a second message that are sent by a network device, where the first message is used to indicate a set of candidate time domain resource units of a physical random access channel of the user equipment, the set of candidate time domain resource units includes a plurality of candidate time domain resource units, the second message carries first indication information, and the first indication information is used to indicate a time domain resource unit format of a first candidate time domain resource unit in the plurality of candidate time domain resource units; and then sending, by the user equipment, a random access preamble to the network device in the first candidate time domain resource unit based on the time domain resource unit format.

In an optional design, the candidate time domain resource unit includes an uplink time domain resource region, the time domain resource unit format is one of a plurality of time domain resource unit formats, and uplink time domain resource regions included in the plurality of time domain resource unit formats have different sizes.

In an optional design, the sending, by the user equipment, a random access preamble to the network device in the first candidate time domain resource unit based on the time domain resource unit format includes: sending, by the user equipment, the random access preamble to the network device in the first candidate time domain resource unit based on a first mapping mode corresponding to the time domain resource unit format of the first candidate time domain unit. The first mapping mode is one of a plurality of first mapping modes. The first mapping mode includes a mode of mapping between the random access preamble and a time domain position in the uplink time domain resource region.

In an optional design, the plurality of first mapping modes includes at least one of the following:

mode 1: the first time domain symbol of the uplink time domain resource region and the first time domain symbol of the random access preamble are spaced by M time domain symbols, where M is greater than or equal to 0;

mode 2: the first time domain symbol of the random access preamble is the first time domain symbol of the uplink time domain resource region, where the uplink time domain resource region includes a first time domain resource region and a second time domain resource region, the first time domain resource region is used to communicate the random access preamble, and the second time domain resource region is used as a guard time; and mode 3: the last time domain symbol of the random access preamble is the last time domain symbol of the uplink time domain resource region.

In an optional design, all candidate time domain resource units included in the set of candidate time domain resource units have a same time domain resource unit format.

In an optional design, the set of candidate time domain resource units includes the first candidate time domain resource unit and a second candidate time domain resource unit, the first candidate time domain resource unit has a first time domain resource unit format, the second candidate time domain resource unit has a second time domain resource unit format, and the first time domain resource unit format is different from the second time domain resource unit format.

In an optional design, the sending, by the user equipment, a random access preamble to the network device in the first candidate time domain resource unit based on the time domain resource unit format includes: sending, by the user equipment, the random access preamble to the network device in the first candidate time domain resource unit based on a random access preamble format corresponding to the time domain resource unit format of the first candidate time domain unit, where the random access preamble format is one of a plurality of different random access preamble formats.

In an optional design, random access preambles in the plurality of different random access preamble formats have different lengths.

For technical effects of corresponding technical solutions in the second aspect and in the various optional designs in the second aspect, refer to descriptions of corresponding technical solutions in the first aspect and in the various optional designs in the first aspect. Details are not described herein.

According to a third aspect, this application provides a method, including: sending, by a network device, a third message to user equipment, where the third message is used to indicate a set of candidate time domain resource units of a physical random access channel of the user equipment, the set of candidate time domain resource units includes a plurality of candidate time domain resource units, the plurality of candidate time domain resource units include a first candidate time domain resource unit, and the first candidate time domain resource unit includes an uplink time domain resource region used to communicate an uplink time domain resource; receiving, by the network device, a random access preamble from the user equipment in the first candidate time domain resource unit; and determining, by the network device, a time domain position of the random access preamble in the first candidate time domain resource unit based on a mode of mapping between the random access preamble and a time domain position in the uplink time domain resource region, where the mode of mapping is that the last time domain symbol of the random access preamble is the last time domain symbol of the uplink time domain resource region.

According to a fourth aspect, this application provides a method, including: receiving, by user equipment, a third message sent by a network device, where the third message is used to indicate a set of candidate time domain resource units of a physical random access channel of the user equipment, the set of candidate time domain resource units includes a plurality of candidate time domain resource units, the plurality of candidate time domain resource units include a first candidate time domain resource unit, and the first candidate time domain resource unit includes an uplink time domain resource region used to communicate an uplink time domain resource; determining, by the user equipment, the set of candidate time domain resource units of the physical random access channel based on the third message; and sending, by the user equipment, a random access preamble in the first candidate time domain resource unit based on a mode of mapping between the random access preamble and a time domain position in the uplink time domain resource region, where the mode of mapping is that the last time domain symbol of the random access preamble is the last time domain symbol of the uplink time domain resource region.

In the third aspect and the fourth aspect, the last time domain symbol of the random access preamble is set to be aligned with the last time domain symbol of the uplink time domain resource region. In this way, the user equipment does not need to determine a time domain resource unit format of the first candidate time domain resource unit, energy consumption of the user equipment can be effectively reduced, and no indication information needs to be sent to indicate a format of the candidate time domain resource unit, thereby effectively reducing system overheads.

According to a fifth aspect, a network device is provided in this application and is configured to perform the method in the first aspect, the third aspect, any possible design of the first aspect, or any possible design of the third aspect. Specifically, the network device includes units configured to perform the method in the first aspect, the third aspect, any possible design of the first aspect, or any possible design of the third aspect.

According to a sixth aspect, user equipment is provided in this application and is configured to perform the method in the second aspect, the fourth aspect, any possible design of the second aspect, or any possible design of the fourth aspect. Specifically, the user equipment includes units configured to perform the method in the second aspect, the fourth aspect, any possible design of the second aspect, or any possible design of the fourth aspect.

According to a seventh aspect, this application provides a network device, including a transceiver, a processor, and a memory, where the transceiver, the processor, and the memory may be connected by using a bus system. The memory is configured to store a program, an instruction, or code. The processor is configured to execute the program, the instruction, or the code in the memory, to perform the method in the first aspect, the third aspect, any possible design of the first aspect, or any possible design of the third aspect.

According to an eighth aspect, this application provides user equipment, including a transceiver, a processor, and a memory, where the transceiver, the processor, and the memory may be connected by using a bus system. The memory is configured to store a program, an instruction, or code. The processor is configured to execute the program, the instruction, or the code in the memory, to perform the method in the second aspect, the fourth aspect, any possible design of the second aspect, or any possible design of the fourth aspect.

According to a ninth aspect, this application provides a computer readable storage medium, where the computer readable storage medium stores an instruction, and when the instruction is run on a computer, the computer is enabled to perform the methods in the foregoing aspects or any possible design of the foregoing aspects.

According to a tenth aspect, this application provides a communications system, including any network device in the fifth or seventh aspect and any user equipment in the sixth aspect or the eighth aspect.

BRIEF DESCRIPTION OF DRAWINGS

To describe technical solutions in embodiments of this application more clearly, the following briefly describes the accompanying drawings for describing the embodiments. The accompanying drawings in the following description show merely some embodiments of this application, and a person of ordinary skill in the art may derive other drawings from these accompanying drawings without creative efforts.

DESCRIPTION OF EMBODIMENTS

Figure 1:
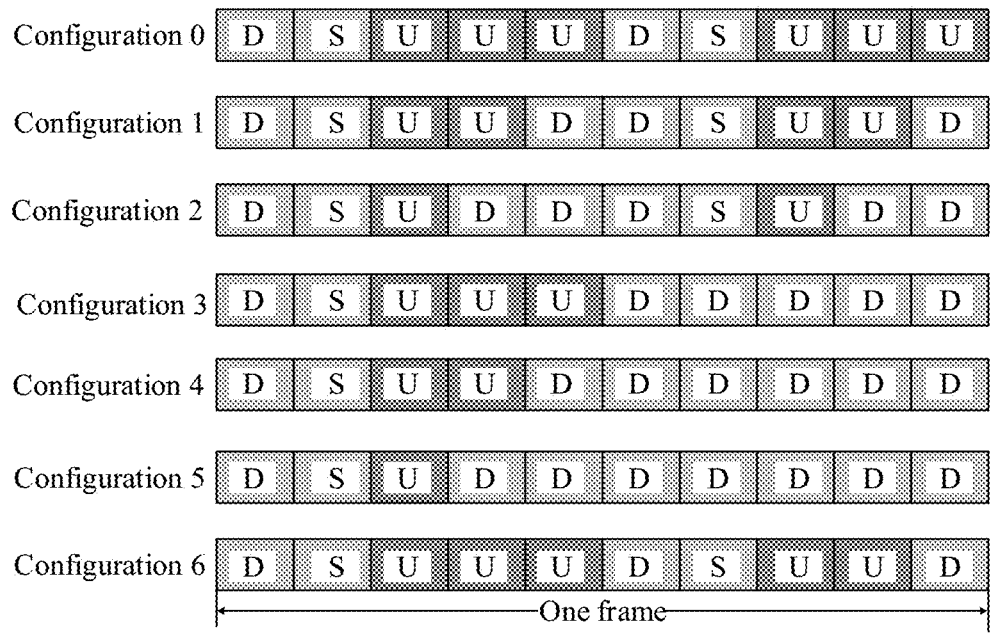
FIG. 1 is a schematic diagram of an uplink-downlink subframe configuration in a TDD mode in the prior art.

The following describes the technical solutions in the embodiments of this application with reference to the accompanying drawings in the embodiments of this application.

The technical solutions of the embodiments of this application may be applied to various communications systems, such as a new radio (NR) system, a wireless fidelity (Wi-Fi) system, a worldwide interoperability for microwave access (WiMAX) system, a global system for mobile communications (GSM), a code division multiple access (CDMA) system, a wideband code division multiple access (WCDMA) system, a general packet radio service (GPRS) system, a long term evolution (LTE) system, a long term evolution advanced (LTE-A) system, a universal mobile telecommunications system (UMTS), a cellular system related to the 3rd Generation Partnership Project (3GPP), and a 5th generation mobile communications system (5th Generation, 5G).

The following explains and describes some terms in this application for ease of understanding by a person skilled in the art.

(1) The "network device" in this application, which may also be referred to as an access network device, may be a gNB (gNode B), may be a common base station (for example, a NodeB (NB) in a WCDMA system, an evolved NodeB (eNB or eNodeB) in an LTE system, a base transceiver station (BTS) in a GSM or CDMA system), may be a new radio controller (NR controller), may be a centralized unit, may be a new radio base station, may be a remote radio module, may be a mobility management entity (MME), may be a micro base station, may be a distributed unit, may be a transmission reception point (TRP) or a transmission point (TP), or may be a radio controller in a cloud radio access network (CRAN) scenario, or the network device may be a relay station, an access point, an vehicular device, a wearable device, a network device in a future 5G network, a network device in a future evolved PLMN network, or any other radio access device. The embodiments of this application are not limited thereto.

(2) The "user equipment (UE)" in this application, which is also referred to as a terminal device, may be a wireless terminal device, or may be a wired terminal device. The wireless terminal device may be a device that provides voice and/or data connectivity for a user, a handheld device having a wireless connection function, or another processing device connected to a wireless modem. The wireless terminal device may communicate with one or more core networks through a radio access network (RAN). The wireless terminal device may be a mobile terminal device, such as a mobile phone (also referred to as a "cellular" phone) and a computer having a mobile terminal device, for example, may be a portable, pocket-sized, handheld, computer built-in, or in-vehicle mobile apparatus, which exchanges voice and/or data with the radio access network. For example, the wireless terminal device may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit (SU), a subscriber station (SS), a mobile station (MS), a mobile console, a remote station (RS), an access point (AP), a remote terminal (RT), an access terminal (AT), a user terminal (UT), a user agent (UA), a user device (UD), or user equipment (UE).

(3) Dynamic time division duplex (D-TDD) means that a network device dynamically adjusts a TDD uplink-downlink time domain resource unit configuration based on requirements of different services for uplink resources and downlink resources. In other words, uplink and downlink resources of a cell are dynamically determined by a network side, and there is no predefined limited uplink-downlink time domain resource unit configuration, such as seven TDD uplink-downlink subframe configurations defined in a TDD mode in an existing LTE system.

(4) The time domain resource unit is a preset transmission time period in time domain or a preset transmission time interval in time domain. The transmission time period is a duration parameter for allocating a time domain resource at a physical layer, and is a unit concept of the time domain resource at the physical layer, for example, a subframe parameter in an LTE system. In this case, the time domain resource unit may be a unit that includes a slot, a subframe, or a mini-slot, or a unit that includes a plurality of slots, a plurality of subframes, or a plurality of mini-slots that are aggregated. The slot may occupy L consecutive OFDM symbols in time domain, and L is a natural number greater than zero. A value of L may be determined based on an actual status, for example, there may be 7 or 14 OFDM symbols. A small slot may also be referred to as a mini-slot, occupies a plurality of consecutive OFDM symbols in time domain, and a quantity of the occupied consecutive OFDM symbols is less than a quantity of OFDM symbols occupied by a slot in which the small slot is located. One slot may include a plurality of small slots. The transmission time interval refers to a length of an independently decodable transmission in a radio link, and is a concept of a unit for time domain resources at a logical layer, for example, a transmission time interval (TTI) parameter in an LTE system.

(5) The time domain position is a position of a time domain symbol in a time domain resource unit, for example, a position of an orthogonal frequency division multiplexing (OFDM) symbol.

(6) The time domain resource unit format refers to a status of uplink and downlink division of symbols included in a time domain resource unit, for example, a subframe in which all symbols are uplink symbols, or a subframe in which most symbols are downlink subframes and a few symbols are uplink subframes, or a subframe in which a few symbols are downlink subframes and most symbols are uplink subframes.

Unless otherwise stated, in the embodiments of this application, ordinal numbers such as "first", "second" "third" and "fourth" are used to distinguish between a plurality of objects, and not intended to limit an order, a time sequence, priorities, or importance of the plurality of objects.

In this application, terms "network", "system", and "wireless network" are usually interchangeably used, terms "user equipment", "terminal", and "terminal device" are usually interchangeably used, and meanings of the terms can be understood by a person skilled in the art.

For ease of understanding the technical solutions of the embodiments of this application, a solution for allocating a random access resource in an existing LTE communications system is introduced first. FIG. 1 is a schematic diagram of seven TDD uplink-downlink subframe configurations defined in a 3GPP enhanced interference management and traffic adaptation (eIMTA) protocol. In a random access procedure of the LTE communications system, a base station notifies, by using a higher layer message (SIB 2 broadcast message), UE in a cell of a set of available time-frequency resources of a physical random access channel PRACH in the cell. Table 1 shows a time-frequency resource list that may be used for random access and that is defined for a TDD frame structure in the current 3GPP 36.211. Each row in the table represents one random access resource configuration and the random access resource configuration is specifically indicated by an index number (PRACH configuration index), and each random access resource configuration in different uplink-downlink subframe configurations (Up Link/Down Link configuration, UL/DL configuration) has a clear definition. Each quaternary element group ($f_{RA}$, $t_{RA}^{(0)}$, $f_{RA}^{(1)}$, $t_{RA}^{(2)}$) in the table uniquely designates one specific random access resource. A first element $f_{RA}$ in the element group is used to indicate a frequency domain resource in the random access resource. For example, the first element 0 of an element group (0, 1, 0, 2) is used to indicate that a frequency domain resource in a random access resource is a frequency domain resource whose index is 0. A second element $t_{RA}^{(0)}$ is used to indicate a system frame that is used to) send a preamble. When $t_{RA}^{(0)}=0$, it indicates that all system frames can be used to send the preamble. When $t_{RA}^{(0)}=1$, it indicates that an even system frame can be used to send the preamble. When $t_{RA}^{(0)}=2$, it indicates that an odd system frame can be used to send the preamble. A third element $t_{RA}^{(1)}$ is used to indicate whether the preamble is located in the first half-frame or the second half-frame of a system frame. When $t_{RA}^{(1)}=0$, it indicates that the preamble is located in the first half-frame of a system frame. When $t_{RA}^{(1)}=1$, it indicates that the preamble is located in the second half-frame of a system frame. A fourth element $t_{RA}^{(2)}$ is used to designate an start uplink subframe index of the preamble, and the subframe index is located between two consecutive downlink-to-uplink switch points, and counting starts from 0. A preamble format Preamble Format 4 is an exception, and $t_{RA}^{(2)}$ of the Preamble Format 4 is marked as (*). The index number (PRACH configuration index) is semi-statically provided by higher layer signaling (SIB 2 broadcast message).

It can be seen from table 1 that in a TDD technology of the current LTE communications system, after the base station semi-statically designates an index number (PRACH configuration index), the UE may determine random access resources corresponding to different uplink-downlink subframe configurations. To be specific, the UE needs to receive a predefined uplink-downlink subframe configuration sent by the base station, to determine, by looking up the table, a time-frequency resource on which the random access procedure should be initiated. However, in a future communications system (for example, a 5th Generation (5G) network communications system, where an official name of a related technology of the 5G communications system is a new radio (NR) technology in a current standard), to use limited radio resources more efficiently, a dynamic-time division duplex (D-TDD) technology becomes a necessary technology for improving radio resource usage flexibility. In the D-TDD technology, uplink resources and downlink resources of a cell are dynamically determined by a network side. In other words, there is no predefined limited uplink-downlink subframe configuration, and in this case, the existing solution that the higher layer signaling is used to semi-statically provide the index number to indicate the random access resource is no longer applicable.

TABLE 1

LTE TDD random access time-frequency resource configuration

| PRACH Configuration Index (See Table 5.7.1-3) | UL/DL configuration (See Table 4.2-2) | | | | | | |
|---|---|---|---|---|---|---|---|
| | 0 | 1 | 2 | 3 | 4 | 5 | 6 |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| 4 | (0, 0, 1, 2) | (0, 0, 1, 1) | (0, 0, 1, 0) | (0, 0, 0, 1) | (0, 0, 0, 0) | N/A | (0, 0, 1, 1) |
| 5 | (0, 0, 0, 1) | (0, 0, 0, 0) | N/A | (0, 0, 0, 0) | N/A | N/A | (0, 0, 0, 1) |
| 6 | (0, 0, 0, 2) (0, 0, 1, 2) | (0, 0, 0, 1) (0, 0, 1, 1) | (0, 0, 0, 0) (0, 0, 1, 0) | (0, 0, 0, 1) (0, 0, 0, 2) | (0, 0, 0, 0) (0, 0, 0, 1) | (0, 0, 0, 0) (1, 0, 0, 0) | (0, 0, 0, 2) (0, 0, 1, 1) |
| 7 | (0, 0, 0, 1) (0, 0, 1, 1) | (0, 0, 0, 0) (0, 0, 1, 0) | N/A | (0, 0, 0, 0) (0, 0, 0, 2) | N/A | N/A | (0, 0, 0, 1) (0, 0, 1, 0) |
| 8 | (0, 0, 0, 0) (0, 0, 1, 0) | N/A | N/A | (0, 0, 0, 0) (0, 0, 0, 1) | N/A | N/A | (0, 0, 0, 0) (0, 0, 1, 1) |
| 9 | (0, 0, 0, 1) (0, 0, 0, 2) (0, 0, 1, 2) | (0, 0, 0, 0) (0, 0, 0, 1) (0, 0, 1, 1) | (0, 0, 0, 0) (0, 0, 1, 0) (1, 0, 0, 0) | (0, 0, 0, 0) (0, 0, 0, 1) (0, 0, 0, 2) | (0, 0, 0, 0) (0, 0, 0, 1) (1, 0, 0, 1) | (0, 0, 0, 0) (1, 0, 0, 0) (2, 0, 0, 0) | (0, 0, 0, 1) (0, 0, 0, 2) (0, 0, 1, 1) |

TABLE 1-continued

LTE TDD random access time-frequency resource configuration

| PRACH Configuration Index (See Table 5.7.1-3) | UL/DL configuration (See Table 4.2-2) | | | | | | |
|---|---|---|---|---|---|---|---|
| | 0 | 1 | 2 | 3 | 4 | 5 | 6 |
| 10 | (0, 0, 0, 0) (0, 0, 1, 0) (0, 0, 1, 1) | (0, 0, 0, 1) (0, 0, 1, 0) (0, 0, 1, 1) | (0, 0, 0, 0) (0, 0, 1, 0) (1, 0, 1, 0) | N/A | (0, 0, 0, 0) (0, 0, 0, 1) (1, 0, 0, 0) | N/A | (0, 0, 0, 0) (0, 0, 0, 2) (0, 0, 1, 0) |
| ... | ... | ... | ... | ... | ... | ... | ... |
| 51 | (0, 0, 0, *) | (0, 0, 0, *) | (0, 0, 0, *) | (0, 0, 0, *) | (0, 0, 0, *) | (0, 0, 0, *) | (0, 0, 0, *) |
| 52 | (0, 0, 1, *) | (0, 0, 1, *) | (0, 0, 1, *) | N/A | N/A | N/A | (0, 0, 1, *) |
| 53 | (0, 0, 0, *) (0, 0, 1, *) | (0, 0, 0, *) (0, 0, 1, *) | (0, 0, 0, *) (0, 0, 1, *) | (0, 0, 0, *) (1, 0, 0, *) | (0, 0, 0, *) (1, 0, 0, *) | (0, 0, 0, *) (1, 0, 0, *) | (0, 0, 0, *) (0, 0, 1, *) |
| 54 | (0, 0, 0, *) (0, 0, 1, *) (1, 0, 0, *) | (0, 0, 0, *) (0, 0, 1, *) (1, 0, 0, *) | (0, 0, 0, *) (0, 0, 1, *) (1, 0, 0, *) | (0, 0, 0, *) (1, 0, 0, *) (2, 0, 0, *) | (0, 0, 0, *) (1, 0, 0, *) (2, 0, 0, *) | (0, 0, 0, *) (1, 0, 0, *) (2, 0, 0, *) | (0, 0, 0, *) (0, 0, 1, *) (1, 0, 0, *) |
| 55 | (0, 0, 0, *) (0, 0, 1, *) (1, 0, 0, *) (1, 0, 1, *) | (0, 0, 0, *) (0, 0, 1, *) (1, 0, 0, *) (1, 0, 1, *) | (0, 0, 0, *) (0, 0, 1, *) (1, 0, 0, *) (1, 0, 1, *) | (0, 0, 0, *) (1, 0, 0, *) (2, 0, 0, *) (3, 0, 0, *) | (0, 0, 0, *) (1, 0, 0, *) (2, 0, 0, *) (3, 0, 0, *) | (0, 0, 0, *) (1, 0, 0, *) (2, 0, 0, *) (3, 0, 0, *) | (0, 0, 0, *) (0, 0, 1, *) (1, 0, 0, *) (1, 0, 1, *) |
| 56 | (0, 0, 0, *) (0, 0, 1, *) (1, 0, 0, *) (1, 0, 1, *) (2, 0, 0, *) | (0, 0, 0, *) (0, 0, 1, *) (1, 0, 0, *) (1, 0, 1, *) (2, 0, 0, *) | (0, 0, 0, *) (0, 0, 1, *) (1, 0, 0, *) (1, 0, 1, *) (2, 0, 0, *) | (0, 0, 0, *) (1, 0, 0, *) (2, 0, 0, *) (3, 0, 0, *) (4, 0, 0, *) | (0, 0, 0, *) (1, 0, 0, *) (2, 0, 0, *) (3, 0, 0, *) (4, 0, 0, *) | (0, 0, 0, *) (1, 0, 0, *) (2, 0, 0, *) (3, 0, 0, *) (4, 0, 0, *) | (0, 0, 0, *) (0, 0, 1, *) (1, 0, 0, *) (1, 0, 1, *) (2, 0, 0, *) |
| 57 | (0, 0, 0, *) (0, 0, 1, *) (1, 0, 0, *) (1, 0, 1, *) (2, 0, 0, *) (2, 0, 1, *) | (0, 0, 0, *) (0, 0, 1, *) (1, 0, 0, *) (1, 0, 1, *) (2, 0, 0, *) (2, 0, 1, *) | (0, 0, 0, *) (0, 0, 1, *) (1, 0, 0, *) (1, 0, 1, *) (2, 0, 0, *) (2, 0, 1, *) | (0, 0, 0, *) (1, 0, 0, *) (2, 0, 0, *) (3, 0, 0, *) (4, 0, 0, *) (5, 0, 0, *) | (0, 0, 0, *) (1, 0, 0, *) (2, 0, 0, *) (3, 0, 0, *) (4, 0, 0, *) (5, 0, 0, *) | (0, 0, 0, *) (1, 0, 0, *) (2, 0, 0, *) (3, 0, 0, *) (4, 0, 0, *) (5, 0, 0, *) | (0, 0, 0, *) (0, 0, 1, *) (1, 0, 0, *) (1, 0, 1, *) (2, 0, 0, *) (2, 0, 1, *) |
| 58 | N/A | N/A | N/A | N/A | N/A | N/A | N/A |
| 59 | N/A | N/A | N/A | N/A | N/A | N/A | N/A |
| 60 | N/A | N/A | N/A | N/A | N/A | N/A | N/A |
| 61 | N/A | N/A | N/A | N/A | N/A | N/A | N/A |
| 62 | N/A | N/A | N/A | N/A | N/A | N/A | N/A |
| 63 | N/A | N/A | N/A | N/A | N/A | N/A | N/A |

NOTE:
*UpPTS

Figure 2:
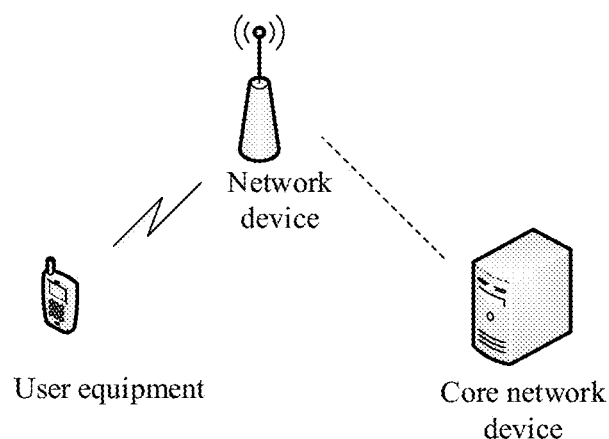
FIG. 2 is a schematic diagram of an application network scenario of a communication method according to an embodiment of this application.

In the background of the prior art, the embodiments of this application provide a communication method, a network device, and user equipment, to dynamically indicate a time domain resource of a physical random access channel in a future communications system. FIG. 2 is a diagram of a system architecture of an example communications system according to an embodiment of this application. The communications system includes a core network device, a network device, and user equipment. The network device is configured to provide a communications service for the user equipment and access a core network. The user equipment accesses the network by searching for a synchronization signal, a broadcast signal and the like sent by the network device. The example communications system, for example, may be an LTE communications system, or may be a future communications system in which a 5G new radio NR technology is used. An LTE communications system is used as an example. The core network device may include, for example, a mobility management entity (MME) or a serving gateway (S-GW), where the MME is mainly responsible for a signaling processing part, namely, a control plane function, including functions such as access control, mobility management, attach and detach, session management, and gateway selection. The S-GW is mainly responsible for a user plane function of forwarding user data, namely, routing and forwarding a data packet under control of the MME. The network device is mainly responsible for at least one of functions such as radio resource management, quality of service (QoS) management, data compression and encryption at an air interface side. To a core network side, the network device is mainly responsible for forwarding control plane signaling to the MME and forwarding user plane service data to the S-GW.

It should be noted that, in a scenario shown in FIG. 2, interaction between one network device, one user equipment, and one core network device is merely used as an example for description, and does not constitute a limitation on application scenarios in this application. An actual network architecture may include a plurality of network devices and a plurality of user equipments. For example, one user equipment may perform data transmission with only one network device, or may perform data transmission with a plurality of network devices. One network device may perform data transmission with one user equipment, or may perform data transmission with a plurality of user equipments. This is not specifically limited in this application.

For ease of understanding by a person skilled in the art, the following describes the embodiments of this application in detail with reference to the accompanying drawings.

Figure 3:
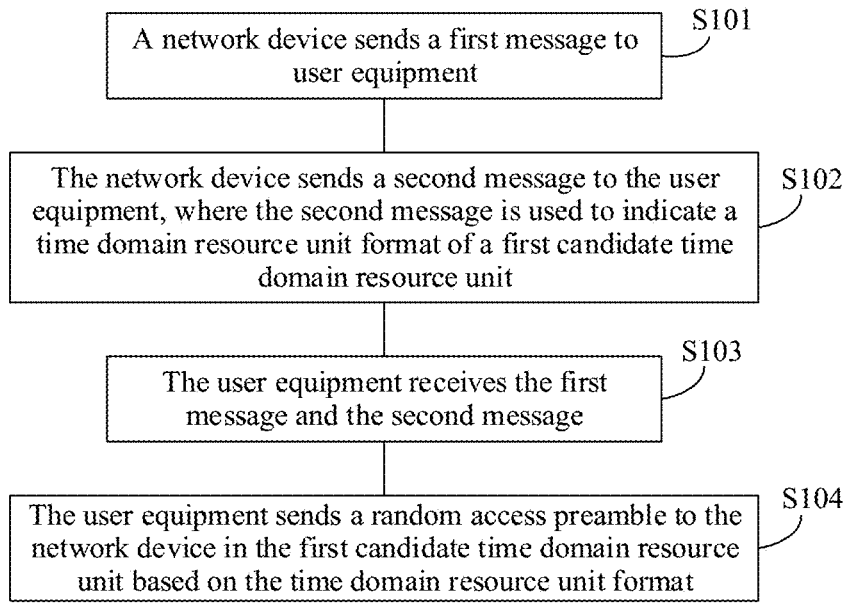
FIG. 3 is a schematic flowchart of a communication method according to an embodiment of this application.

As shown in FIG. 3, an embodiment of this application provides a communication method 100, where the communication method 100 may be used in a dynamic TDD mode. The method 100 may be applied to the scenario shown in FIG. 2.

S101. A network device sends a first message to user equipment.

Specifically, the first message is used to indicate a set of candidate time domain resource units of a physical random access channel of the user equipment, and the set of candidate time domain resource units includes a plurality of candidate time domain resource units.

In a specific implementation, the first message may be, for example, system information (for example, SIB), higher layer signaling, or other dedicated signaling, and the higher layer signaling may be, for example, radio resource control RRC signaling or MAC signaling. This is not specifically limited in this application. For a manner of indicating the set of candidate time domain resource units by the first message, refer to the following specific description.

The network device may determine the set of candidate time domain resource units based on a status of uplink and downlink resource scheduling. The network device may alternatively determine the set of candidate time domain resource units according to a predefined rule, for example, determine, based on different service requirements, a set that includes a plurality of time domain resource units that meet a preset condition as the set of candidate time domain resource units. A specific manner in which the network device determines the set of candidate time domain resource units is not specifically limited in this application.

S102. The network device sends a second message to the user equipment, where the second message is used to indicate a time domain resource unit format of a first candidate time domain resource unit in the plurality of candidate time domain resource units.

Specifically, the second message carries first indication information, and the first indication information is used to indicate the time domain resource unit format of the first time domain resource unit. The candidate time domain resource unit includes an uplink time domain resource region, the time domain resource unit format is one of a plurality of time domain resource unit formats, and uplink time domain resource regions included in the plurality of time domain resource unit formats have different sizes.

The time domain resource unit format of the first time domain resource unit may be used by the user equipment to determine a random access preamble format, or may be used by the user equipment to determine a time domain position of the random access preamble in the first time domain resource unit.

In a specific implementation, the second message may be physical layer control signaling or other dedicated signaling. This is not specifically limited in this application. The first indication information may be carried in physical layer control signaling in the first candidate time domain resource unit, or may be carried in physical layer control information in a $P^{th}$ time domain resource unit prior to the first time domain resource unit, where p is an integer greater than or equal to 0. The physical layer control signaling may be specifically common physical layer downlink control signaling, or may be a group physical layer downlink control signaling. When the second message is common physical layer downlink control signaling, the network device sends the first indication information to all user equipments in a cell. When the second message is group physical layer downlink control signaling, the network device sends the first indication information to some user equipments in a cell. The physical layer control signaling may be, for example, downlink control information (DCI) in an LTE system.

The first indication information may be bits (0 or 1) that carry identification information, and the bits are used to indicate the first time domain resource unit format. For example, an identification information sequence 001 corresponding to the bits is used to indicate a format 1 of a first type of time domain resource unit shown in FIG. 4, and an identification information sequence 010 corresponding to the bits is used to indicate a format 2 of a second type of time domain resource unit shown in FIG. 4. This is not specifically limited in this application. The first indication information may alternatively be, for example, a plurality of bits that carry identification information including 0 or 1 and each bit corresponds to a preconfigured time domain resource unit format. When each bit is set to 0 or 1, it indicates a format used for the first time domain resource unit. For example, three time domain resource unit formats are predefined in a system, for example, three time domain resource unit formats shown in FIG. 4, and in this case, the first indication information includes three bits, and the three bits, for example, are respectively defined as L bit, M bit, and N bit, where the L bit, M bit and N bit respectively correspond to a format 1, a format 2, and a format 3. For example, when the L bit is set to 1, and the M bit and the N bit are set to 0, it indicates that the format 1 is used for the first time domain resource unit; when the L bit and the N bit are set to 0, and the M bit is set to 1, it indicates that the format 2 is used for the first time domain resource unit. Certainly, that the L bit is set to 0, and the M and N bits are set to 1 may be alternatively used to indicate that the format 1 is used for the first time domain resource unit; when the L bit and the N bit are set to 1, and the M bit is set to 0, it indicates that the format 2 is used for the first time domain resource unit. The meaning represented by bit 0 or bit 1 is not specifically limited in this application. The first indication information may alternatively be, for example, an index of a time domain resource unit format used for the first time domain resource unit. For example, "1" indicates that the time domain resource unit format used for the first time domain resource unit is the format 1 shown in FIG. 4. A specific form of the first indication information is not specifically limited in this application.

S103. The user equipment receives the first message and the second message.

The user equipment determines the set of candidate time domain resource units of the physical random access channel based on the first message, and the set of candidate time domain resource units includes a plurality of candidate time domain resource units. The user equipment determines one candidate time domain resource unit in the plurality of candidate time domain resource units as the first time domain resource unit.

S104. The user equipment sends a random access preamble to the network device in the first candidate time domain resource unit based on the time domain resource unit format.

The time domain resource unit format of the first time domain resource unit may be used by the user equipment to determine a random access preamble format, or may be used by the user equipment to determine a time domain position of the random access preamble in the first time domain resource unit. The following provides a specific description.

In an optional implementation, S104 may be S104a: The user equipment sends the random access preamble to the network device in the first candidate time domain resource unit based on a first mapping manner corresponding to the time domain resource unit format of the first candidate time domain unit. The first mapping manner is one of a plurality of first mapping modes. The first mapping manner includes a manner of mapping between the random access preamble and a time domain position in the uplink time domain resource region.

The user equipment determines the time domain resource unit format of the first time domain resource unit based on the second message. The user equipment determines the random access preamble format based on the time domain resource unit format of the first time domain resource unit.

In a specific implementation of this application, all candidate time domain resource units in the set of candidate time domain resource units have a same format, and the user equipment selects, based on a preconfigured preamble format, any candidate time domain resource unit from the set of candidate time domain resource units as the first time domain resource unit.

Figure 4:
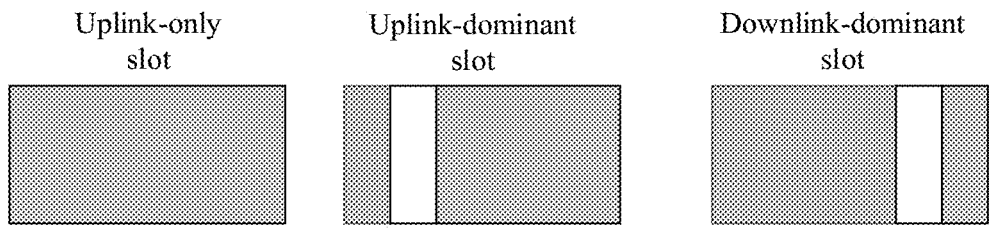
FIG. 4 is a schematic diagram of a time domain resource unit format according to an embodiment of this application.

In this application, the time domain resource unit includes but is not limited to a time domain resource unit including an uplink time domain resource region, such as a UL-only time domain resource unit, a UL-dominant time domain resource unit, or a DL-dominant time domain resource unit, and the uplink time domain resource region includes uplink resource transmission symbols and used to configure an uplink time domain resource. FIG. 4 schematically shows several possible time domain resource unit formats. Referring to FIG. 4, in a UL-only time domain resource unit, all time domain symbols of the entire time domain resource unit are used to communicate an uplink resource. In a UL-dominant time domain resource unit, a quantity of time domain symbols used to communicate an uplink resource is greater than a quantity of time domain symbols used to communicate a downlink resource; and in a DL-dominant time domain resource unit, a quantity of time domain symbols used to communicate a downlink resource is greater than a quantity of time domain symbols used to communicate an uplink resource.

In another specific implementation of this application, at least two candidate time domain resource units in the set of candidate time domain resource units have different time domain resource unit formats. The different time domain resource unit formats may be, for example, different formats shown in FIG. 4.

In this application, the user equipment can use one or more preamble formats. The one or more preamble formats may be configured for the user equipment in a pre-configuration manner; or indication information may be sent to the user equipment from the network device, to indicate one or more preamble formats that can be used by the user equipment. In a specific implementation, the first message may further carry a first indication field, and the first indication field is used to indicate at least one random access preamble format that can be used by the user equipment. The first indication field may be bits (0 or 1) that carry identification information, and the bits are used to indicate at least one format of the preamble. For example, an identification information sequence 001 corresponding to the bits is used to indicate a format 1 of a preamble shown in FIG. 5, and an identification information sequence 010 corresponding to the bits is used to indicate a format 2 of a second preamble shown in FIG. 5. This is not specifically limited in this application. The first indication field may alternatively be, for example, a plurality of bits (0 or 1) that carry identification information, and each bit corresponds to a preconfigured preamble format. When each bit is set to 0 or 1, it indicates whether the user equipment can use a corresponding preamble format. For example, that the user equipment can use three preamble formats is predefined in a system, namely, three preamble formats shown in FIG. 5, and in this case, the first indication field includes three bits, and the three bits, for example, are respectively defined as S bit, K bit and W bit, where the S bit, K bit, and N bit respectively correspond to a format 1, a format 2, and a format 3. The S bit is used as an example. When the S bit is set to 1, it indicates that a user equipment can use the format 1; and when the S bit is set to 0, it indicates that the user equipment cannot use the format 1. Certainly, that the S bit is set to 1 may alternatively be used to indicate that the user equipment cannot use the format 1, and that the S bit is set to 0 may be used to indicate that the user equipment can use the format 1. The meaning represented by bit 0 or bit 1 is not specifically limited in this application.

In a specific implementation of this application, when the user equipment can use a plurality of preamble formats, the user equipment may determine, based on a mapping relationship between a plurality of formats of the random access preamble and the plurality of time domain resource unit formats, a random access preamble format corresponding to the time domain resource unit format of the first time domain resource unit.

Figure 5:
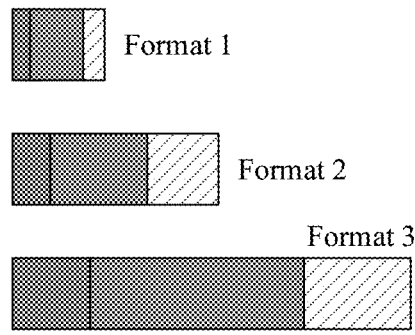
FIG. 5 is a schematic diagram of a random access preamble format according to an embodiment of this application.

Specifically, there is a one-to-one mapping between the plurality of formats of the random access preamble and the plurality of time domain resource unit formats. For example, the format 1 shown in FIG. 5 may correspond to the format 3 shown in FIG. 4. When the user equipment determines that the format of the first time domain resource unit is the format 3 shown in FIG. 4, it may be determined that the format 1 shown in FIG. 5 is used to carry the random access preamble.

In an optional implementation, S104 may be S104b: The user equipment sends the random access preamble to the network device in the first candidate time domain resource unit based on a random access preamble format corresponding to the time domain resource unit format of the first candidate time domain unit, where the random access preamble format is one of a plurality of different random access preamble formats.

The following specifically describes a manner of determining a time domain position of the random access preamble in an uplink time domain resource region of the first time domain resource unit. In a specific implementation, the time domain position of the random access preamble in the uplink time domain resource region may be determined based on a mapping mode between the random access preamble and the uplink time domain resource region. The mapping mode between the random access preamble and the uplink time domain resource region includes but is not limited to the following modes.

Mode 1: The first time domain symbol of the random access preamble is shifted by M time domain symbols relative to the first time domain symbol of the uplink time domain resource region, where M is an integer greater than or equal to 0.

In mode 1, for different time domain resource unit formats, values of the offset value M may be different, and a size of the offset value may be predefined.

Mode 2: For all different time domain resource unit formats, a value by which a start time domain position of the random access information is shifted relative to the first time domain symbol of the uplink time domain resource region is 0. To be specific, for each of different time domain resource unit formats that can be used to send a random access resource, the random access resource is mapped from the first time domain symbol in the uplink time domain resource region. In other words, the first time domain symbol of the preamble is aligned with the first time domain symbol of the uplink time domain resource region.

Mode 3: The uplink time domain resource region includes a first time domain resource region and a second time domain resource region. On the basis of mode 2, the first time domain resource region is used to communicate the random access preamble, and the second time domain resource region is used as a guard time GT.

Mode 4: The last time domain symbol of the random access preamble is aligned with the last time domain symbol of the uplink time domain resource region. In this case, for each of different time domain resource units that can be used to send a random access resource, mode 4 is used to determine the time domain position of the preamble, so that the user equipment does not need to detect the first time domain resource unit format.

In a dynamic TDD mode, a first message is used to indicate a set of candidate time domain resource units of a physical random access channel of user equipment. In this case, the user equipment may determine, based on the indication of the first message, one candidate time domain resource unit in the set of candidate time domain resource units as a first time domain resource unit, so as to determine a time domain resource of a PRACH that is used to carry random access information. In this way, an uplink-downlink subframe configuration does not need to be predefined, and a requirement for dynamic indication of a random access resource in a communications system can be met, thereby improving random access resource allocation flexibility. Further, the set of candidate time domain resource units includes a plurality of candidate time domain resource units. This can effectively avoid a case in which a large quantity of user equipments attempt random access in one time domain resource unit simultaneously, and can effectively reduce resource conflicts that are probably caused when the user equipment performs PRACH resource configuration in a random access procedure.

In a specific implementation, a third message may be used to indicate a frequency domain resource of a random physical access channel, and the third message may be, for example, system information (for example, SIB) or higher layer signaling. The higher layer signaling may be, for example, system information (for example, SIB), higher layer signaling, or dedicated signaling, or the higher layer signaling may be, for example, radio resource control RRC signaling or MAC signaling. This is not specifically limited in this application.

The following specifically describes a manner of indicating the set of candidate time domain resource units by using the first message. In a specific implementation, the manner of indicating the set of candidate time domain resource units by using the first message includes but is not limited to the following manners.

Manner 1: It is predefined that when the network device sends the first message in a time domain resource unit n, a total of m time domain resource units are used as the set of candidate time domain resource units, where the m time domain resource units are obtained by counting from a time domain resource unit n+k that is spaced by k time domain resource units from the time domain resource unit n, n is an integer greater than or equal to 0, and k is an integer greater than or equal to 0.

Manner 2: A bit mapping mode is used to indicate the set of candidate time domain resource units.

It is assumed that in a future communications system, a time unit (for example, a system frame in LTE) that is used for uplink and downlink transmission in time domain is defined as a set of system time domain resource units, and the set of system time domain resource unit includes a plurality of time domain resource units. The first message includes a second indication field, and the second indication field is used to indicate the set of candidate time domain resource units. The second indication field may be, for example, a plurality of bits (0 or 1) that carry identification information in the first message. The plurality of bits included in the second indication field are in a one-to-one correspondence with the plurality of time domain resource units included in the set of system time domain resource units. For example, when a corresponding bit is set to 1, it indicates that a time domain resource unit corresponding to the bit is a candidate time domain resource unit; when the corresponding bit is set to 0, it indicates that the time domain resource unit corresponding to the bit is not a candidate time domain resource unit. Certainly, that the bit is set to 0 or 1 may alternatively indicate an opposite meaning. This is not specifically limited in this application. For example, the set of system time domain resource units includes time domain resource units 1 to 4, and the second indication field is "0011", where "00" indicates that a time domain resource unit 1 and a time domain resource unit 2 are not candidate time domain resource units, and "11" indicates a set of candidate time domain resource units, to be specific, a time domain resource unit 3 and a time domain resource unit 4 are candidate time domain resource units.

Manner 3: Numbers of candidate time domain resource units are carried in the first message to indicate the set of candidate time domain resource units.

Specifically, in the foregoing system time domain resource unit, each time domain resource unit has a corresponding time domain resource unit number, for example, the first message may include a plurality of third indication fields, each third indication field may be, for example, three bits (0 or 1) that carry identification information, and the three bits are used to indicate a value P corresponding to a number of a candidate time domain resource unit. For example, 000 corresponds to P=0, 001 corresponds to P=1, 010 corresponds to P=2, 011 corresponding to P=3, 100 corresponds to P=4, 101 corresponds to P=5, 110 corresponds to P=6, and 111 corresponds to P=7, and so on. Details are not described herein. After receiving the first message, the user equipment determines a corresponding number of a candidate time domain resource unit based on an identification information sequence corresponding to the bits in each third indication field, and further determines the set of candidate time domain resource units.

Manner 4: The first message carries an index of the set of candidate time domain resource units, for example, "1". In this case, it indicates that the set of candidate time domain resource units includes the time domain resource unit 3 and the time domain resource unit 4.

Manner 5: The first message carries an index of a set of non-candidate time domain resource units, for example, "2", indicating a set that includes the time domain resource unit 1 and the time domain resource unit 2. In this case, the user equipment may determine that the set of candidate time domain resource units includes the time domain resource unit 3 and the time domain resource unit 4.

By using the foregoing manner 4 and manner 5, signaling overheads can be effectively reduced.

Manner 6: Different pieces of configuration information of a set of candidate time domain resource units may be preconfigured on each of the network device and the user equipment. For example, configuration 1: The set of candidate time domain resource units includes a time domain resource unit 3 and a time domain resource unit 4; configuration 2: The set of candidate time domain resource units includes time domain resource units 2 to 4; configuration 3: The set of candidate time domain resource units includes a time domain resource unit 2 and a time domain resource unit 3. This is merely an example, and details are not described herein. In this case, the configuration information of the set of candidate time domain resource units may be a configuration identifier that is of a set of candidate time domain resource units and that is carried in the first message, and the identifier is used to identify one of the preconfigured configurations 1 to 3.

A person skilled in the art may understand that another manner may be used to indicate the set of candidate time domain resource units, and details are not described herein.

Further, the first message may include a fourth indication field, and the fourth indication field is used to indicate a frequency domain resource of the random access channel. The fourth indication field may be, for example, bits (0 or 1) that carry identification information in the first message, and the bits are used to indicate that a specific part of a frequency domain resource in a time domain resource unit may be used as the frequency domain resource of the physical random access channel of the user equipment. For example, an identification information sequence 001 corresponding to the bits is used to indicate that a frequency domain resource whose index is 1 is used as the frequency domain resource of the physical random access channel, and an identification information sequence 010 corresponding to the bits is used to indicate that a frequency domain resource whose index is 2 is used as the frequency domain resource of the physical random access channel. This is not specifically limited in this application.

Figure 6:
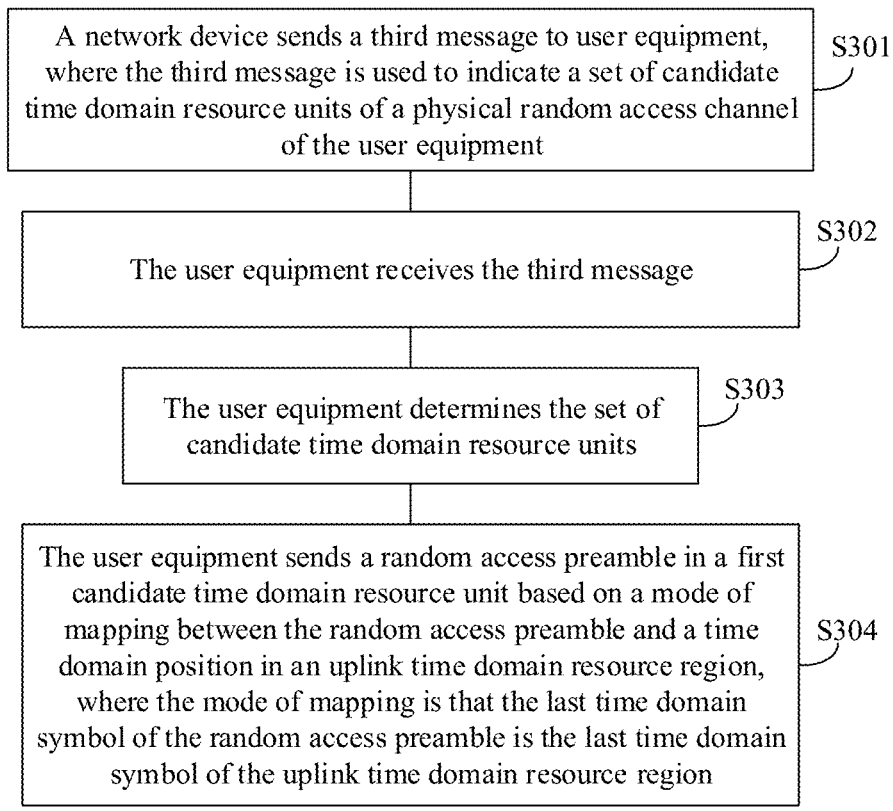
FIG. 6 is a schematic flowchart of a communication method according to an embodiment of this application.

FIG. 6 is a schematic flowchart of a communication method 300 according to an embodiment of this application. The method 300 may be applied to a scenario shown in FIG. 1. The method 300 includes the following steps.

S301. A network device sends a third message to user equipment.

Specifically, the third message is used to indicate a set of candidate time domain resource units of a physical random access channel of the user equipment. The set of candidate time domain resource units includes a plurality of candidate time domain resource units. The plurality of candidate time domain resource units include a first candidate time domain resource unit. The first candidate time domain resource unit includes an uplink time domain resource region used to communicate an uplink time domain resource.

S302. The user equipment receives the third message.

S303. The user equipment determines the set of candidate time domain resource units of the physical random access channel.

Specifically, a specific description of a manner of determining the set of candidate time domain resource units of the physical random access channel by the user equipment based on the third message and a manner of indicating the set of candidate time domain resource units of the physical random access channel by using the third message, refer to a specific description of the manner of determining the set of candidate time domain resource units of the physical random access channel based on the first message and the manner of indicating the set of candidate time domain resource units of the physical random access channel by using the first message in the foregoing method 200. Details are not described herein.

S304. The user equipment sends a random access preamble to the network device in the first candidate time domain resource unit.

Specifically, the user equipment sends the random access preamble in the first candidate time domain resource unit based on a mode of mapping between the random access preamble and a time domain position in the uplink time domain resource region, where the mode of mapping is that the last time domain symbol of the random access preamble is the last time domain symbol of the uplink time domain resource region.

S305. The network device receives the random access preamble from the user equipment in the first candidate time domain resource unit.

Specifically, the network device determines a time domain position of the random access preamble in the first candidate time domain resource unit based on the mode of mapping between the random access preamble and a time domain position in the uplink time domain resource region, where the mode of mapping is that the last time domain symbol of the random access preamble is the last time domain symbol of the uplink time domain resource region.

In the method 300, the last time domain symbol of the random access preamble is set to be aligned with the last time domain symbol of the uplink time domain resource region. In this way, the user equipment does not need to determine a time domain resource unit format of the first candidate time domain resource unit, energy consumption of the user equipment can be effectively reduced, and no indication information needs to be sent to indicate a format of the candidate time domain resource unit, thereby effectively reducing system overheads.

The following describes apparatuses corresponding to the foregoing method embodiments with reference to the accompanying drawings.

Figure 7:
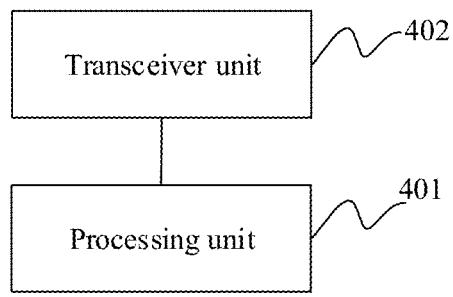
FIG. 7 is a schematic structural diagram of a network device according to an embodiment of this application.

FIG. 7 is a schematic diagram of a network device 400 according to an embodiment of this application. The network device 400 may be applied to the scenario shown in FIG. 1, and is configured to perform the method corresponding to FIG. 3 or FIG. 6. As shown in FIG. 4, the network device 400 includes a processing unit 401 and a transceiver unit 402. The transceiver unit may be specifically configured to perform various types of information sending and receiving performed by the network device in the method 200 or the method 300; and the processing unit 401 is specifically configured to perform other processing different from information sending and receiving by the network device in the method 200 or the method 300.

For example, the transceiver unit 402 may be configured to send a first message and a second message to user equipment. The first message is used to indicate a set of candidate time domain resource units of a physical random access channel of the user equipment, and the set of candidate time domain resource units includes a plurality of candidate time domain resource units. The second message carries first indication information, and the first indication information is used to indicate a time domain resource unit format of a first candidate time domain resource unit in the plurality of candidate time domain resource units. The processing unit 401 may be configured to control the transceiver unit 402 to receive, from the user equipment based on the time domain resource unit format, a random access preamble in the first candidate time domain resource unit.

For another example, the transceiver unit 402 may be configured to send a third message to user equipment. The third message is used to indicate a set of candidate time domain resource units of a physical random access channel of the user equipment, the set of candidate time domain resource units includes a plurality of candidate time domain resource units, the plurality of candidate time domain resource units include a first candidate time domain resource unit, and the first candidate time domain resource unit includes an uplink time domain resource region used to communicate an uplink time domain resource. The transceiver unit may be further configured to receive a random access preamble from the user equipment in the first candidate time domain resource unit. The processing unit 401 is configured to determine a time domain position of the random access preamble in the first candidate time domain resource unit based on a mode of mapping between the random access preamble and a time domain position in the uplink time domain resource region, where the mode of mapping is that the last time domain symbol of the random access preamble is the last time domain symbol of the uplink time domain resource region.

For specific content, refer to the description of the related part in the method 200 or the method 300, and details are not described herein.

Figure 8:
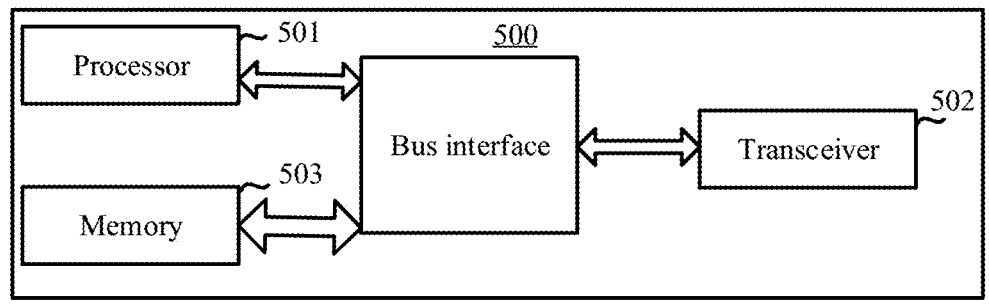
FIG. 8 is a schematic structural diagram of another network device according to an embodiment of this application.

It should be understood that division of the foregoing units is merely logical function division. In an actual implementation, all or some of units may be integrated into a physical entity, or may be physically separate. The transceiver unit 402 in this embodiment of this application may be implemented by a transceiver, and the processing unit 401 may be implemented by a processor. As shown in FIG. 8, a network device 500 may include a processor 501, a transceiver 502, and a memory 503. The memory 503 may be configured to store a program/code preinstalled when the network device 500 is delivered from a factory, or may store code executed by the processor 501, or the like.

It should be understood that the network device 500 according to this embodiment of this application may correspond to the network device in the method 200 or the method 300 according to the embodiments of this application, the transceiver 502 is configured to perform various types of information sending and receiving performed by the network device in the method 200 or the method 300, and the processor 501 is configured to perform other processing different from information sending and receiving by the network device in the method 200 or the method 300. Details are not described herein.

Figure 9:
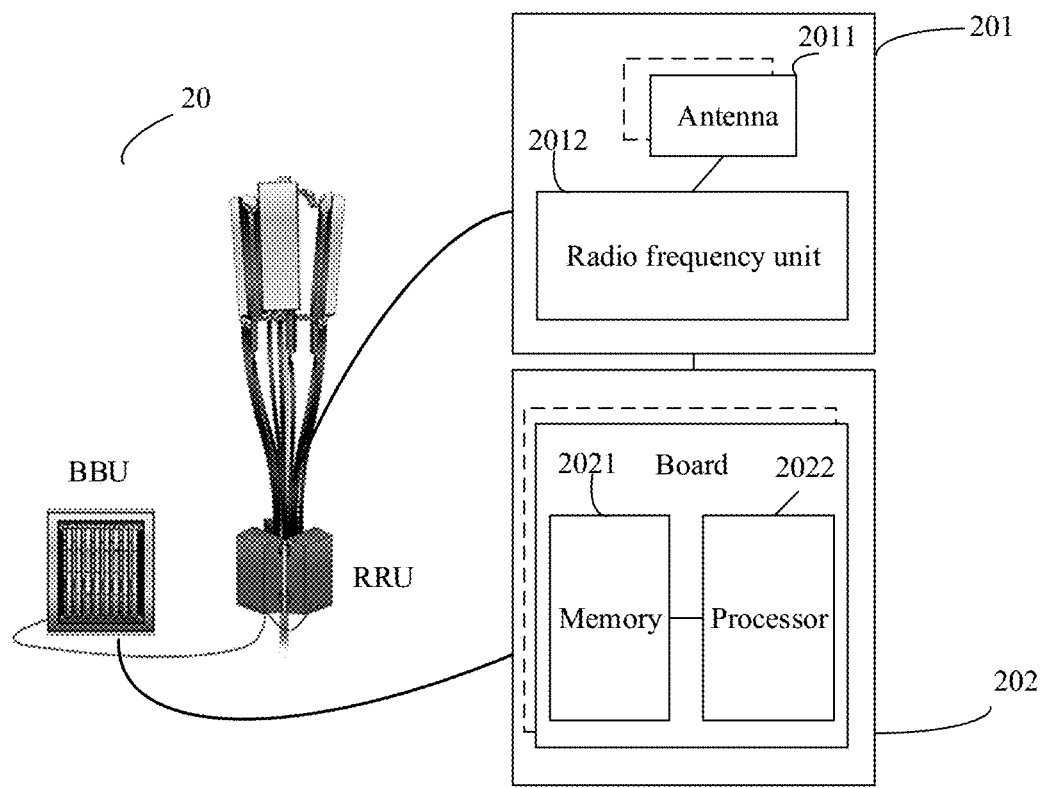
FIG. 9 is a schematic structural diagram of still another network device according to an embodiment of this application.

FIG. 9 is a schematic structural diagram of a network device 20. The network device 20 may be, for example, a base station. The network device 20 may be applied to the system shown in FIG. 1, and is configured to perform the method corresponding to FIG. 3 or FIG. 6. The network device 20 includes one or more remote radio units (RRU) 201 and one or more baseband units (BBU) 202. The RRU 201 may be referred to as a transceiver unit, a transceiver, a transceiver circuit, a transceiver, or the like, and may include at least one antenna 2011 and a radio frequency unit 2012. The RRU201 is mainly configured to: perform radio frequency signal sending and receiving, and perform conversion between a radio frequency signal and a baseband signal, for example, perform various information sending and receiving performed by the network device in the method 200 or 300. The BBU 202 is mainly configured to: perform baseband processing, control the network device, and the like. The RRU 201 and the BBU 202 may be physically disposed together, or may be physically separately disposed, for example, a distributed base station.

The BBU 202 is a control center of the network device, or may be referred to as a processing unit, and is mainly configured to complete baseband processing functions such as channel coding, multiplexing, modulation, and spectrum spreading. For example, the BBU (processing unit) may be configured to control the network device to perform other processing different from information sending and receiving in the method 200 or the method 300.

In an example, the BBU 202 may include one or more boards, and a plurality of boards may all support a radio access network (such as an LTE network) of a single access standard, or may separately support radio access networks of different access standards. The BBU 202 further includes a memory 2021 and a processor 2022. The memory 2021 is configured to store a necessary instruction and necessary data. The processor 2022 is configured to control the network device to perform necessary actions, for example, control the network device to perform other processing different from information sending and receiving in the method 200 or the method 300. The memory 2021 and the processor 2022 may serve one or more boards. In other words, a memory and a processor may be separately disposed on each board. Alternatively, a plurality of boards may use a same memory and a same processor. In addition, a necessary circuit is further disposed on each board.

Figure 10:
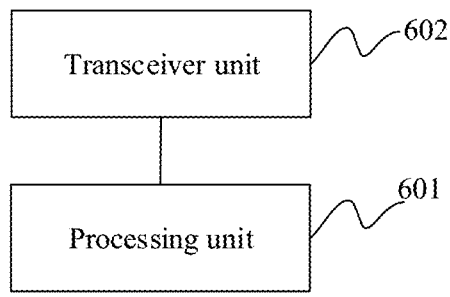
FIG. 10 is a schematic structural diagram of user equipment according to an embodiment of this application.

FIG. 10 is a schematic diagram of a terminal device 600 according to an embodiment of this application. The terminal device 600 may be applied to the scenario shown in FIG. 1, and is configured to perform the method corresponding to FIG. 3 or FIG. 6. As shown in FIG. 7, the terminal device 600 includes a processing unit 601 and a transceiver unit 602. The transceiver unit 602 may be specifically configured to perform various types of information sending and receiving performed by the user equipment in the method 200 or the method 300; and the processing unit 601 is specifically configured to perform other processing different from information sending and receiving by the user equipment in the method 200 or the method 300.

For example, the transceiver unit 602 is configured to receive a first message sent by a network device. The first message is used to indicate a set of candidate time domain resource units of a physical random access channel of the user equipment, and the set of candidate time domain resource units includes a plurality of candidate time domain resource units. The transceiver unit is further configured to receive a second message sent by the network device, where the second message carries first indication information, and the first indication information is used to indicate a time domain resource unit format of a first candidate time domain resource unit in the plurality of candidate time domain resource units. The processing unit 601 is configured to control the transceiver unit 602 to send a random access preamble to the network device in the first candidate time domain resource unit based on the time domain resource unit format.

For another example, the transceiver unit 602 is configured to receive a third message sent by a network device. The third message is used to indicate a set of candidate time domain resource units of a physical random access channel of the user equipment, the set of candidate time domain resource units includes a plurality of candidate time domain resource units, the plurality of candidate time domain resource units include a first candidate time domain resource unit, and the first candidate time domain resource unit includes an uplink time domain resource region used to communicate an uplink time domain resource. The processing unit 601 is configured to determine the set of candidate time domain resource units of the physical random access channel based on the third message. The processing unit 601 is further configured to control the transceiver unit 602 to send the random access preamble in the first candidate time domain resource unit based on a mode of mapping between the random access preamble and a time domain position in the uplink time domain resource region, where the mode of mapping is that the last time domain symbol of the random access preamble is the last time domain symbol of the uplink time domain resource region.

For specific content, refer to the specific description in the foregoing method 200 or method 300, and details are not described herein.

Figure 11:
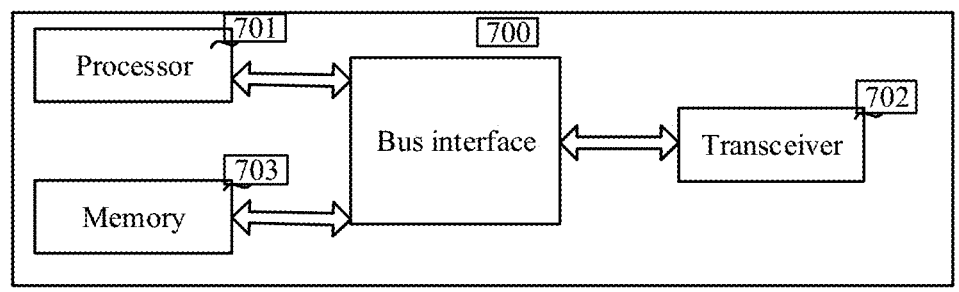
FIG. 11 is a schematic structural diagram of still another user equipment according to an embodiment of this application.

It should be understood that division of the foregoing units is merely logical function division. In an actual implementation, all or some of units may be integrated into a physical entity, or may be physically separate. The transceiver unit 602 in this embodiment of this application may be implemented by a transceiver, and the processing unit 601 may be implemented by a processor. As shown in FIG. 11, a terminal device 700 may include a processor 701, a transceiver 702, and a memory 703. The memory 703 may be configured to store a program/code preinstalled when the terminal device 700 is delivered from a factory, or may store code executed by the processor 701, or the like.

It should be understood that the terminal device 700 according to this embodiment of this application may correspond to the terminal device in the method 200 or the method 300 according to the embodiments of this application, the transceiver 702 is configured to perform various types of information sending and receiving performed by the user equipment in the method 200 or the method 300, and the processor 701 is configured to perform other processing different from information sending and receiving by the user equipment in the method 200 or the method 300. Details are not described herein.

Figure 12:
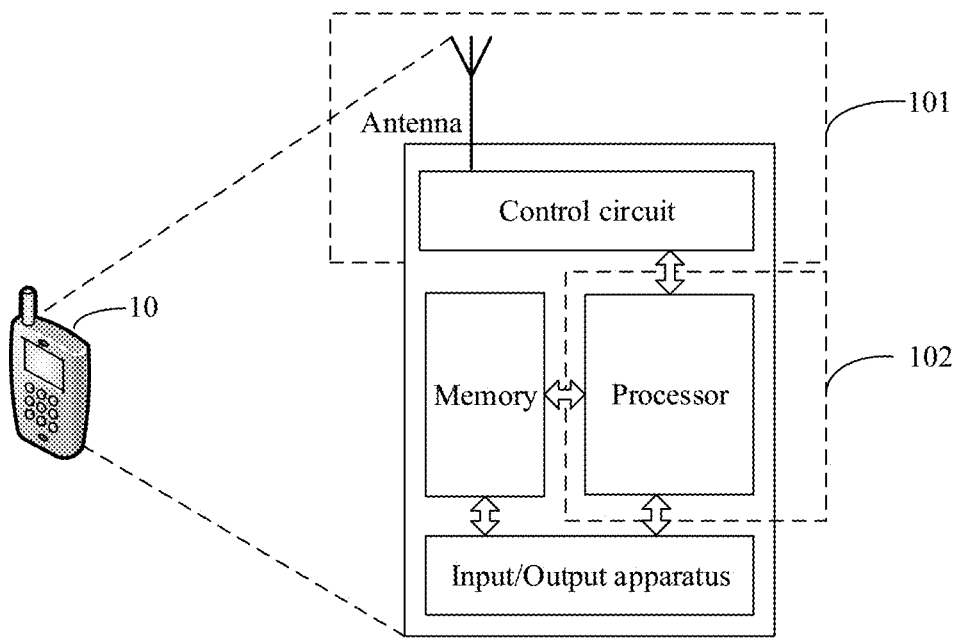
FIG. 12 is a schematic structural diagram of still another user equipment according to an embodiment of this application.

FIG. 12 is a schematic structural diagram of user equipment. The user equipment may be applied to the scenario shown in FIG. 1, and is configured to perform the method corresponding to FIG. 3 or FIG. 6. For ease of description, FIG. 12 shows only main components of the terminal device. As shown in FIG. 12, the terminal device 10 includes a processor, a memory, a control circuit, an antenna, and an input/output apparatus. The control circuit is mainly configured to perform conversion between a baseband signal and a radio frequency signal and process the radio frequency signal. The control circuit and the antenna may also be collectively referred to as a transceiver, and are mainly configured to send and receive a radio frequency signal in an electromagnetic wave form, and receive a signaling indication and/or a reference signal sent by a base station, and are configured to perform various types of information sending and receiving performed by the terminal device in the method 200 or the method 300. For details, refer to the description about the foregoing related part. The processor is mainly configured to: process a communication protocol and communication data, control the entire terminal device, execute a software program, and process data of the software program, for example, is configured to support the terminal device in performing other processing different from information sending and receiving in the method 200 or the method 300. The memory is mainly configured to store a software program and data. The input/output apparatus, such as a touchscreen, a display, or a keyboard, is mainly configured to: receive data entered by a user and output data to the user.

After the terminal device is powered on, the processor may read a software program in a storage unit, explain and execute an instruction of the software program, and process data of the software program. When data needs to be sent in a wireless manner, the processor performs baseband processing on the to-be-sent data, and then outputs a baseband signal to a radio frequency circuit. After the radio frequency circuit performs radio frequency processing on the baseband signal, the radio frequency circuit sends a radio frequency signal by using the antenna in an electromagnetic wave form. When data is sent to the terminal device, the radio frequency circuit receives the radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 12 shows only one memory and one processor. In actual user equipment, a plurality of processors and memories may exist. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data, and the central processing unit is mainly configured to: control the entire terminal device, execute a software program, and process data of the software program. Functions of the baseband processor and the central processing unit are integrated into the processor in FIG. 12. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may also be expressed as a central processing circuit or a central processing chip. A function of processing a communication protocol and communication data may be embedded into the processor, or may be stored in a storage unit in a form of a software program, so that the processor executes the software program to implement a baseband processing function.

For example, in this embodiment of this application, the antenna and the control circuit that have sending and receiving functions may be considered as a transceiver unit 101 of the terminal device 10, and the processor having a processing function may be considered as a processing unit 102 of UE 10. As shown in FIG. 12, the terminal device 10 includes the transceiver unit 101 and the processing unit 102. The transceiver unit may also be referred to as a transceiver, a transceiver, a transceiver apparatus, or the like. Optionally, a component that is in the transceiver unit 101 and is configured to implement a receiving function may be considered as a receiving unit, and a component that is in the transceiver unit 101 and is configured to implement a sending function may be considered as a sending unit. In other words, the transceiver unit 101 includes the receiving unit and the sending unit. For example, the receiving unit may also be referred to as a receiver, a receiver, a receiver circuit, or the like, and the sending unit may be referred to as a transmitter, a transmitter, a transmit circuit, or the like.

The transceiver in the embodiments of this application may be a wired transceiver, a wireless transceiver, or a combination thereof. The wired transceiver may be, for example, an Ethernet interface. The Ethernet interface may be an optical interface, an electrical interface, or a combination thereof. For example, the wireless transceiver may be a wireless local area network transceiver, a cellular network transceiver, or a combination thereof. The processor may be a central processing unit (CPU), a network processor (NP), or a combination of the CPU and the NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory may include a volatile memory, for example, a random access memory (RAM); or the memory may include a non-volatile memory, for example, a read-only memory (ROM), a flash memory, a hard disk drive (HDD), or a solid-state drive (SSD); or the memory may include a combination of the foregoing types of memories.

A bus interface may be further included in FIG. 8 and FIG. 11. The bus interface may include any quantity of interconnected buses and bridges. Specifically, various circuits of one or more processors represented by the processor and various circuits of memories represented by the memory are connected. The bus interface may further connect various other circuits, such as a peripheral device, a voltage regulator, and a power management circuit. This is well known in the art, and therefore is not further described in this specification. The bus interface provides an interface. The transceiver provides a unit for communicating with various other devices on a transmission medium. The processor is responsible for management of a bus architecture and general processing, and the memory may store data that is used by the processor to perform an operation.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that such implementation goes beyond the protection scope of the embodiments of this application.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general purpose processor may be a microprocessor. Optionally, the general-purpose processor may be any conventional processor, controller, microcontroller, or state machine. The processor may alternatively be implemented by a combination of computing apparatuses, such as a digital signal processor and a microprocessor, a plurality of microprocessors, one or more microprocessors together with a digital signal processor core, or any other similar configuration.

Steps of the methods or algorithms described in the embodiments of this application may be directly embedded into hardware, a software unit executed by the processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to the processor, so that the processor may read information from the storage medium and write information to the storage medium. Alternatively, the storage medium may be integrated into the processor. The processor and the storage medium may be arranged in an ASIC, and the ASIC may be arranged in UE. Optionally, the processor and the storage medium may be arranged in different components of the UE.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be communicated from a computer-readable storage medium to another computer-readable storage medium. For example, the computer instructions may be communicated from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

The embodiments in this specification are all described in a progressive manner, for same or similar parts in the embodiments, reference may be made to these embodiments, and each embodiment focuses on a difference from other embodiments. Especially, apparatus and system embodiments are basically similar to a method embodiment, and therefore are described briefly; for related parts, reference may be made to descriptions of the parts in the method embodiment.

The foregoing descriptions of this specification in this application may enable a person skilled in the art to use or implement the content of this application. It should be considered that any modification made based on the disclosed content is obvious in the art. The basic principles described in this application may be applied to other variations without departing from the essence and scope of this application. Therefore, the content disclosed in this application is not limited to the described embodiments and designs, but may further be extended to a maximum scope that is consistent with the principles of this application and new features disclosed in this application.

What is claimed is:
1. A communications method comprising:
  receiving, by a terminal device, a first message from a network device, wherein the first message is used to indicate a set of candidate time domain resource units of a physical random access channel;

receiving, by the terminal device, a second message from the network device, wherein the second message carries first indication information, and the first indication information is used to indicate a time domain resource unit format of a first candidate time domain resource unit in the set of candidate time domain resource units, wherein the candidate time domain resource unit comprises an uplink time domain resource region, the time domain resource unit format is one of a plurality of time domain resource unit formats, and uplink time domain resource regions of the plurality of time domain resource unit formats have different sizes; and sending, by the terminal device, a random access preamble to the network device in the first candidate time domain resource unit based on a first mapping mode corresponding to the time domain resource unit format of the first candidate time domain unit, wherein the first mapping mode is one of a plurality of first mapping modes, and the first mapping mode comprises a mode of mapping between the random access preamble and a time domain position in the uplink time domain resource region.

2. The method according to claim 1, wherein the plurality of first mapping modes comprises at least one of the following:

mode 1: the first time domain symbol of the uplink time domain resource region and the first time domain symbol of the random access preamble are spaced by M time domain symbols, wherein M is greater than or equal to 0;

mode 2: the first time domain symbol of the random access preamble is the first time domain symbol of the uplink time domain resource region, wherein the uplink time domain resource region comprises a first time domain resource region and a second time domain resource region, the first time domain resource region is used to transmit the random access preamble, and the second time domain resource region is used as a guard time; or mode 3: the last time domain symbol of the random access preamble is the last time domain symbol of the uplink time domain resource region.

3. The method according to claim 1, wherein:

the plurality of first mapping modes are preset in the terminal device; or the method further comprises:

receiving, by the terminal device, second indication information from the network device, wherein the second indication information is used to indicate the plurality of first mapping modes.

4. The method according to claim 1, wherein:

all candidate time domain resource units of the set of candidate time domain resource units have a same time domain resource unit format; or the set of candidate time domain resource units comprises the first candidate time domain resource unit and a second candidate time domain resource unit, the first candidate time domain resource unit has a first time domain resource unit format, the second candidate time domain resource unit has a second time domain resource unit format, and the first time domain resource unit format is different from the second time domain resource unit format.

5. The method according to claim 1, wherein the sending, by the terminal device, the random access preamble to the network device in the first candidate time domain resource unit is further based on a random access preamble format corresponding to the time domain resource unit format of the first candidate time domain unit, and wherein the random access preamble format is one of a plurality of different random access preamble formats.

6. The method according to claim 5, wherein random access preambles in the plurality of different random access preamble formats have different lengths.

7. A terminal device, comprising:

a transceiver, configured to:

receive a first message from a network device, wherein the first message is used to indicate a set of candidate time domain resource units of a physical random access channel; and receive a second message from the network device, wherein the second message carries first indication information, and the first indication information is used to indicate a time domain resource unit format of a first candidate time domain resource unit in the set of candidate time domain resource units, wherein the candidate time domain resource unit comprises an uplink time domain resource region, the time domain resource unit format is one of a plurality of time domain resource unit formats, and uplink time domain resource regions of the plurality of time domain resource unit formats have different sizes; and a processor, configured to control the transceiver to send a random access preamble to the network device in the first candidate time domain resource unit based on a first mapping mode corresponding to the time domain resource unit format of the first candidate time domain unit, wherein the first mapping mode is one of a plurality of first mapping modes, and the first mapping mode comprises a mode of mapping between the random access preamble and a time domain position in the uplink time domain resource region.

8. The terminal device according to claim 7, wherein the plurality of first mapping modes comprises at least one of the following:

mode 1: the first time domain symbol of the uplink time domain resource region and the first time domain symbol of the random access preamble are spaced by M time domain symbols, wherein M is greater than or equal to 0;

mode 2: the first time domain symbol of the random access preamble is the first time domain symbol of the uplink time domain resource region, wherein the uplink time domain resource region comprises a first time domain resource region and a second time domain resource region, the first time domain resource region is used to transmit the random access preamble, and the second time domain resource region is used as a guard time; or mode 3: the last time domain symbol of the random access preamble is the last time domain symbol of the uplink time domain resource region.

9. The terminal device according to claim 7, wherein:

the plurality of first mapping modes are preset in the terminal device; or the transceiver is further configured to receive second indication information from the network device, wherein the second indication information is used to indicate the plurality of first mapping modes.

10. The terminal device according to claim 7, wherein:
all candidate time domain resource units of the set of candidate time domain resource units have a same time domain resource unit format; or
the set of candidate time domain resource units comprises the first candidate time domain resource unit and a second candidate time domain resource unit, the first candidate time domain resource unit has a first time domain resource unit format, the second candidate time domain resource unit has a second time domain resource unit format, and the first time domain resource unit format is different from the second time domain resource unit format.

11. The terminal device according to claim 7, wherein the processor is configured to control the transceiver to send the random access preamble to the network device in the first candidate time domain resource unit further based on a random access preamble format corresponding to the time domain resource unit format of the first candidate time domain unit, and wherein the random access preamble format is one of a plurality of different random access preamble formats.

12. The terminal device according to claim 11, wherein random access preambles in the plurality of different random access preamble formats have different lengths.

13. A non-transitory computer readable storage medium, comprising instructions, wherein when the instructions are run on a computer, the computer is enabled to perform steps comprising:
receiving a first message from a network device, wherein the first message is used to indicate a set of candidate time domain resource units of a physical random access channel;
receiving a second message from the network device, wherein the second message carries first indication information, and the first indication information is used to indicate a time domain resource unit format of a first candidate time domain resource unit in the set of candidate time domain resource units, wherein the candidate time domain resource unit comprises an uplink time domain resource region, the time domain resource unit format is one of a plurality of time domain resource unit formats, and uplink time domain resource regions of the plurality of time domain resource unit formats have different sizes; and
sending a random access preamble to the network device in the first candidate time domain resource unit based on a first mapping mode corresponding to the time domain resource unit format of the first candidate time domain unit, wherein the first mapping mode is one of a plurality of first mapping modes, and the first mapping mode comprises a mode of mapping between the random access preamble and a time domain position in the uplink time domain resource region.

14. The non-transitory computer readable storage medium according to claim 13, wherein the plurality of first mapping modes comprises at least one of the following:
mode 1: the first time domain symbol of the uplink time domain resource region and the first time domain symbol of the random access preamble are spaced by M time domain symbols, wherein M is greater than or equal to 0;
mode 2: the first time domain symbol of the random access preamble is the first time domain symbol of the uplink time domain resource region, wherein the uplink time domain resource region comprises a first time domain resource region and a second time domain resource region, the first time domain resource region is used to transmit the random access preamble, and the second time domain resource region is used as a guard time; or
mode 3: the last time domain symbol of the random access preamble is the last time domain symbol of the uplink time domain resource region.

15. The non-transitory computer readable storage medium according to claim 13, wherein:
the plurality of first mapping modes are preset; or
when the instructions are run on the computer, the computer is enabled to perform steps further comprising:
receiving second indication information from the network device, wherein the second indication information is used to indicate the plurality of first mapping modes.

16. The non-transitory computer readable storage medium according to claim 13, wherein:
all candidate time domain resource units of the set of candidate time domain resource units have a same time domain resource unit format; or
the set of candidate time domain resource units comprises the first candidate time domain resource unit and a second candidate time domain resource unit, the first candidate time domain resource unit has a first time domain resource unit format, the second candidate time domain resource unit has a second time domain resource unit format, and the first time domain resource unit format is different from the second time domain resource unit format.

17. The non-transitory computer readable storage medium according to claim 13, wherein the step of
sending the random access preamble to the network device in the first candidate time domain resource unit is further based on a random access preamble format corresponding to the time domain resource unit format of the first candidate time domain unit, and wherein the random access preamble format is one of a plurality of different random access preamble formats.

18. The non-transitory computer readable storage medium according to claim 13, wherein random access preambles in the plurality of different random access preamble formats have different lengths.

* * * * *